(12) United States Patent
Regunathan et al.

(10) Patent No.: US 9,435,873 B2
(45) Date of Patent: Sep. 6, 2016

(54) SOUND SOURCE LOCALIZATION USING PHASE SPECTRUM

(75) Inventors: Shankar Regunathan, Redmond, WA (US); Kazuhito Koishida, Redmond, WA (US); Harshavardhana Narayana Kikkeri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 814 days.

(21) Appl. No.: 13/182,449

(22) Filed: Jul. 14, 2011

(65) Prior Publication Data

US 2013/0016852 A1 Jan. 17, 2013

(51) Int. Cl.
*H04R 3/00* (2006.01)
*G01S 3/80* (2006.01)
*G01S 3/808* (2006.01)
*G01S 3/82* (2006.01)

(52) U.S. Cl.
CPC ............ *G01S 3/8006* (2013.01); *G01S 3/8083* (2013.01); *G01S 3/82* (2013.01)

(58) Field of Classification Search
CPC . H04R 3/005; H04R 1/406; H04R 2201/401
USPC ......... 381/92, 309, 26, 56, 310, 356; 700/94
See application file for complete search history.

(56) References Cited

U.S. PATENT DOCUMENTS

| | | | |
|---|---|---|---|
| 4,558,439 A | 12/1985 | Gudesen | |
| 5,610,991 A * | 3/1997 | Janse | G10L 21/0208 381/13 |
| 7,583,808 B2 | 9/2009 | Smaragdis et al. | |
| 7,822,213 B2 | 10/2010 | Choi et al. | |
| 8,358,563 B2 | 1/2013 | Hiroe | |
| 2002/0181721 A1 | 12/2002 | Sugiyama et al. | |
| 2004/0032796 A1 | 2/2004 | Chu et al. | |
| 2005/0100176 A1* | 5/2005 | Chu et al. | 381/92 |
| 2006/0204019 A1* | 9/2006 | Suzuki et al. | 381/92 |

(Continued)

FOREIGN PATENT DOCUMENTS

| | | |
|---|---|---|
| CN | 1831554 A | 9/2006 |
| CN | 101617245 A | 12/2009 |

(Continued)

OTHER PUBLICATIONS

"International Search Report", Mailed Date: Jan. 24, 2013, Application No. PCT/US2012/045996, Filed date: Jul. 10, 2012, pp. 9.

(Continued)

*Primary Examiner* — Lun-See Lao
(74) *Attorney, Agent, or Firm* — Sunah Lee; Fehmi Chebil; Micky Minhas

(57) ABSTRACT

An array of microphones placed on a mobile robot provides multiple channels of audio signals. A received set of audio signals is called an audio segment, which is divided into multiple frames. A phase analysis is performed on a frame of the signals from each pair of microphones. If both microphones are in an active state during the frame, a candidate angle is generated for each such pair of microphones. The result is a list of candidate angles for the frame. This list is processed to select a final candidate angle for the frame. The list of candidate angles is tracked over time to assist in the process of selecting the final candidate angle for an audio segment.

20 Claims, 5 Drawing Sheets

(56) References Cited

U.S. PATENT DOCUMENTS

| | | | |
|---|---|---|---|
| 2008/0089531 A1* | 4/2008 | Koga et al. | 381/92 |
| 2008/0247274 A1 | 10/2008 | Seltzer et al. | |
| 2009/0018828 A1 | 1/2009 | Nakadai et al. | |
| 2009/0285409 A1 | 11/2009 | Yoshizawa et al. | |
| 2010/0303254 A1* | 12/2010 | Yoshizawa et al. | 381/92 |
| 2013/0121499 A1* | 5/2013 | Li et al. | 381/71.1 |

FOREIGN PATENT DOCUMENTS

| | | |
|---|---|---|
| EP | 1600791 A1 | 11/2005 |
| EP | 2202531 A1 | 6/2010 |
| JP | H05273326 A | 10/1993 |
| JP | 09021863 A | 1/1997 |
| JP | 4339929 B2 | 7/2009 |
| JP | 2009236688 A | 10/2009 |
| JP | 2009293968 A | 12/2009 |
| JP | 2010020294 A | 1/2010 |
| WO | 02058432 A2 | 7/2002 |

OTHER PUBLICATIONS

Valin, et al., "Robust Sound Source Localization Using a Microphone Array on a Mobile Robot", Retrieved at <<http://jmvalin.ca/papers/iros.pdf>>, Oct. 27-31, 2003, pp. 6.

Cho, et al., "Sound Source Localization for Robot Auditory Systems", Retrieved at <<http://coe.uncc.edu/~jmconrad/ECGR6185-2010-01/readings/Hailu_sound-localization.pdf>>, Jul. 15, 2009, pp. 1663-1668.

Valin, et al., "Robust Localization and Tracking of Simultaneous Moving Sound Sources Using Beamforming and Particle Filtering", Retrieved at <<http://jmvalin.ca/papers/valin_localization.pdf>>, May 3, 2006, pp. 37.

Shimoyama, et al., "Multiple Acoustic Source Localization Using Ambiguous Phase Differences under Reverberative Conditions", Retrieved at <<http://www.jstage.jst.go.jp/article/ast/25/6/446/_pdf>>, Acoust. Science & Tech. 25, 6 (2), Jun. 18, 2004, pp. 446-456.

"Office Action Issued in European Patent Application No. 12811427.9", Mailed Date: Feb. 17, 2015, 7 Pages.

"Search Report Issued in European Patent Application No. 12811427.9", Mailed Date: Jan. 30, 2015, 3 Pages.

"Office Action Issued in Chinese Patent Application No. 201280034621.0", Mailed Date: Nov. 15, 2014, 12 Pages.

"Second Office Action Issued in Chinese Patent Application No. 201280034621.0", Mailed Date: Jun. 26, 2015, 6 Pages.

Office Action Issued in Japanese Patent Application No. 2014-520240, Mailed Date: Jun. 21, 2016, 7 Pages. (W/o English Translation).

Office Action Issued in European Patent Application No. 12811427.9, Mailed Date: Jul. 14, 2016, 5 Pages.

* cited by examiner

SOUND SOURCE LOCALIZATION USING PHASE SPECTRUM

BACKGROUND

In several applications it is helpful to determine the location of a sound source using microphones that capture acoustic energy generated by that sound source.

One way to determine this location is to search the space for an area of maximum energy. This approach typically is not robust against interference, such as noise and reverberation.

Another way to determine this location is to determine the difference in arrival times at different microphones. An acoustic wave from a sound source will arrive at different times at different sensors at different locations. A common approach for measuring this difference involves measuring a phase difference of the signals received by a pair of microphones by finding a peak of a cross correlation function. This approach is not robust against interference, such as noise and reverberation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An array of microphones placed on a mobile robot provides multiple channels of audio signals. A received set of audio signals is called an audio segment, which is divided into multiple frames. A phase analysis is performed on a frame of the signals from each pair of microphones. If both microphones are in an active state during the frame, a candidate angle is generated for each such pair of microphones. The result is a list of candidate angles for the frame. This list is processed to select a final candidate angle for the frame. The list of candidate angles is tracked over time to assist in the process of selecting the final candidate angle for that audio segment.

In response to the tracked angle, a variety of operations can be performed by the mobile robot. For example, the mobile robot can move based on the sensed location of the sound. The robot can respond to a human speaker, for example by facing and moving towards the speaker. Such repositioning of the robot can help obtain better audio signals from a microphone array, which can improve other audio processing operations. This location information also can be input to a face detection processor, as it can give a good clue of the position to a human face.

Accordingly, in one aspect, signals are received from a plurality of pairs of microphones into the memory. The signals from the microphones are processed to identify when the signals are active and compute frequency spectrum data for the signals. For each pair of active signals, a candidate angle is determined for the pair using the frequency spectrum data. An angle is selected from among the candidate angles for a plurality of pairs of microphones. In one embodiment, each signal is stored as a plurality of frames, and processed on a per frame basis.

A history of candidate angles is stored over multiple frames, and the history is updated with the candidate angles from the current frame. For example, the angle selected from the history can be one that has a phase distortion less than or equal to the minimum phase distortion of all entries. The angle selected from the history can be one that has an angle similar to a highest ranked candidate angle for the frame. The angle selected from the history can be one that has a presence score greater than or equal to a maximum presence score of angles in the history In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which sound source localization can be implemented.

Figure 1:
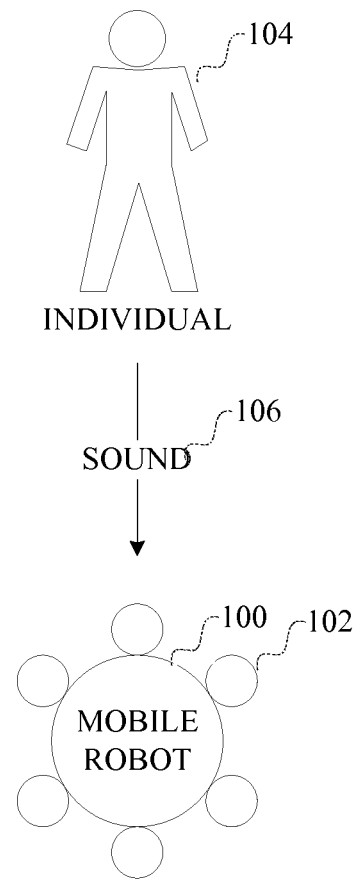
FIG. 1 is a schematic diagram of an application of sound source localization on a mobile robot.

Referring to FIG. 1, a mobile robot 100 includes an array of microphones 102.

While FIG. 1 is designated as a mobile robot, any object that can support an array of microphones 102 so as to maintain a known spatial relationship among the microphones can be used. The use of sound source localization with a mobile robot is merely an example application in which this technique can be used. The microphone array can be supported by one or more stationary objects instead of mobile objects. However, a mobile object, such as a robot, can be moved in response to the determined location of a sound source.

While FIG. 1 illustrates six microphones, the number and configuration of the microphones is not limited to the configuration in FIG. 1. Any configuration and number of microphones may be used, provide that there is a known spatial relationship between each pair of microphones in the array, and that the array include multiple pairs of microphones. The invention is not limited by the kind of microphones used. To avoid normalization of signals from multiple microphones, both microphones in each pair of microphones are the same type.

In one application, the sound source can be a human speaker 104. The human speaker produces sounds 106 when speaking. Other sound sources can be detected, however, in this application the robot can be designed to interact with a human speaker and determining a location for the human speaker can be used as an aid in this interaction.

Given this context, an example implementation of sound source localization will now be described in more detail in connection with FIGS. 2-5.

Figure 2:
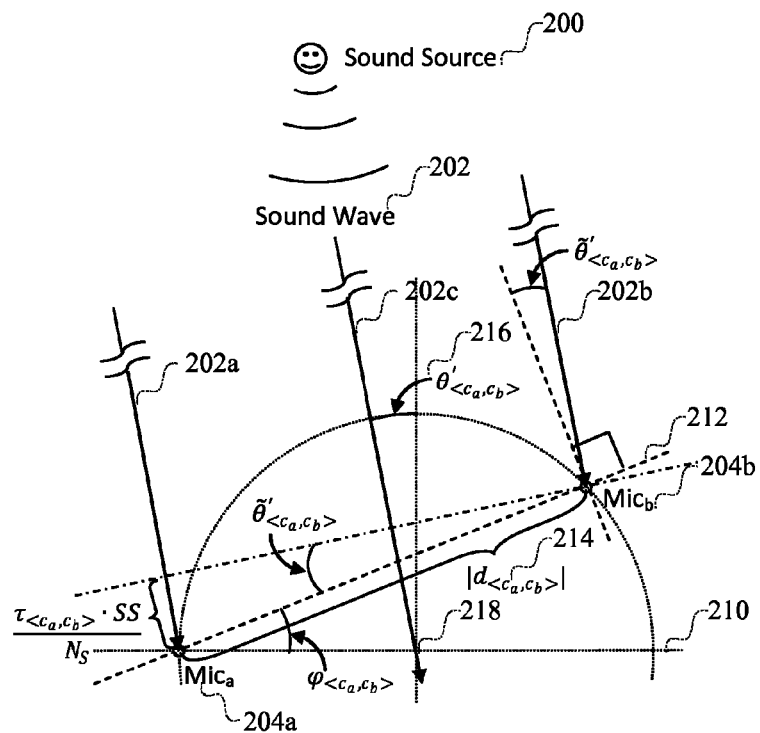
FIG. 2 is a schematic diagram illustrating how an angle of a sound wave is computed from two microphones.

In FIG. 2, how a location of a sound source 200 can be determined will now be described. A sound source 200 generates a sound wave 202. The sound wave travels at a known rate (e.g., 340 meters per second in typical environments). As indicated at 202a, 202b, and 202c, the sound wave travels to, and arrives at, microphones 204a and 204b at different times. Microphones 204a and 204b are an example of a channel pair (herein labeled "<$c_a$, $c_b$>"). Given a channel pair <$c_a$, $c_b$>, there is a global angle $\phi_{<c_a,c_b>}$, which represents the angle between a reference line 210 through an origin 218, and a line 212 through the two microphones. The reference line 210 and origin 218 are the same for all channel pairs in the microphone array. A channel pair distance $|d_{<c_a,c_b>}|$, such as shown at 214, represents the geometric distance between two microphones. Sound source localization involves computing the angle 216 ($\theta'_{<c_a,c_b>}$) between a line through the sound wave source and the origin 218 and a line perpendicular to the reference line 210. How this angle is derived is described in more detail below.

Figure 3:
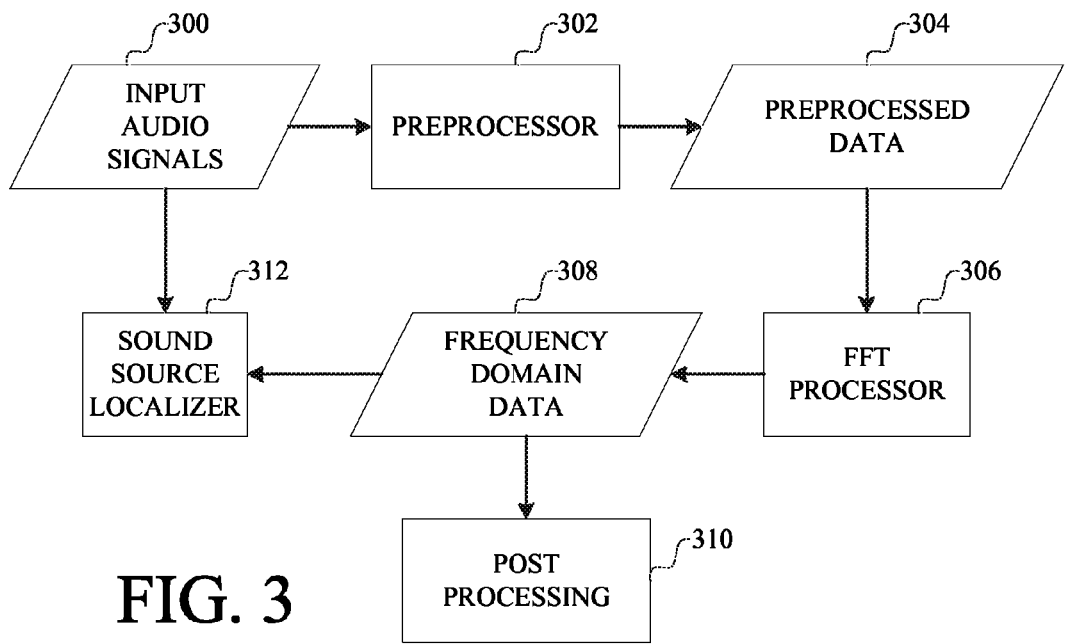
FIG. 3 is a data flow diagram illustrating an example implementation of sound source localization.

Referring now to FIG. 3, a data flow diagram describing an example implementation of sound source localization will now be described. This implementation receives input audio signals 300 from the microphone array (not shown). Each microphone provides an audio signal, such as a K-bit digital audio signal sampled at a sampling rate of S samples per second. A suitable value for K is 16 and a suitable value for S is 16 kHz. Thus, a microphone array of eight microphones provides an eight channel input audio signal. The input audio signal is processed on frame basis, where a frame contains 128 samples. The input audio signal of c-th channel at i-th frame is represented as $x_{c,i}(n)$ where n=0, 1, ... N−1 (N=128), c=0, 1, ... C−1 (C=8). The input signals $x_{c,i}(n)$ are processed to produce the angle of sound arrival $\theta_i$ for the i-th frame.

A preprocessor 302 receives the input audio signals 300 and performs a variety of operations on the signals to prepare them for analysis.

Such preprocessing can include a DC removal filter. Such a DC removal filter is used to suppress undesirable components at very low frequencies for subsequent processing. An example implementation of such a filter is a first-order finite impulse response (FIR) filter and the input signal is processed channel-by-channel. The output of the filter is computed as $$x'_{c,i}(n) = x_{c,i}(n) - 0.97 x_{c,i}(n-1)$$

where n=0, 1, . . . , N−1, c=0, 1, . . . , C−1, and $x_{c,i}(-1)$ is the last sample in the previous frame, i.e., $x_{c,i}(-1) = x_{c,i-1}(N-1)$.

Another example of preprocessing is applying a Hamming window. The Hamming window h(n) is multiplied across two frames, previous and current, and a C-channel windowed signal is generated:

$$x''_{c,i}(n) = \begin{cases} h_N(n) x'_{c,i}(n), & n = 0, 1, \ldots, N-1 \\ h_N(2N-1-n) x'_{c,i}(n-N), & n = N, N+1, \ldots, 2N-1 \end{cases}$$

where $$h_N(n) = 0.54 - 0.46\cos\frac{2\pi n}{2N-1}, n = 0, 1, \ldots, N-1.$$

The windowed signal, $x''_{c,i}(n)$, contains 2N samples.

By applying the Hamming window, the separability of neighborhood spectrum elements can be improved so that the phase analysis described below performs better.

The output 304 of the preprocessing stage, in this example the output of the Hamming window, is then input to a fast Fourier transform (FFT) processor 306. The output of the FFT processor is frequency domain data 308. In this example implementation. For example, an FFT with size 2N can be applied to $x''_{c,i}(n)$ to obtain the complex values of frequency spectrum $X_{c,i}(k)$ for each channel. Because of the mirror image property, $X_{c,i}(k)$ has unique values in the range of the frequency bin k=0, 1, . . . K(=N/2), which corresponds to 0, 8000/K, . . . , 8000 Hz, so that the spectrum within that range is processed in the subsequent operations.

The frequency domain data 308 can be subjected to further post processing for a variety of applications, such as speech recognition, as indicated by the post processing module 310. The invention is neither limited by, nor requires, such post processing.

Finally, in this example implementation, the frequency domain data 308 and the input signals 300 are input to a sound source localizer 312, described in more detail below, to produce, for each frame i, the angle of sound arrival $\theta_i$ for the i-th frame.

Figure 4:
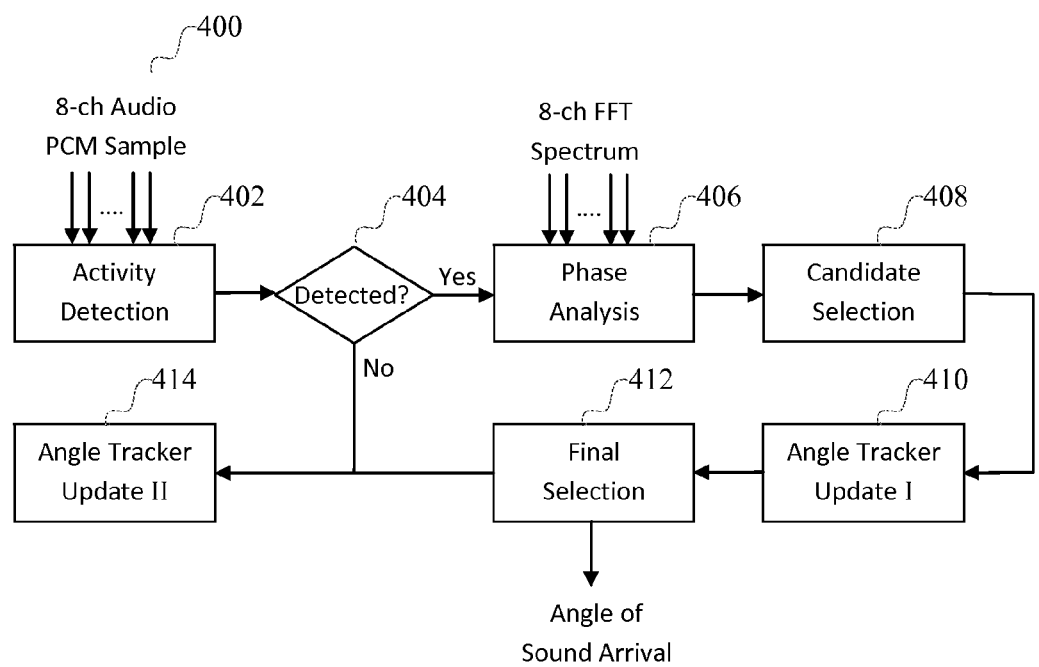
FIG. 4 is a more detailed data flow diagram of parts of FIG. 3.

Referring now to FIG. 4, an example implementation of the sound source localizer 312 of FIG. 3 will now be described in more detail.

The input audio signals 400 are input to an activity detector 402, which outputs data indicative of whether the audio signal is active in a given frame. An example implementation of the activity detector is the following:

The log energy of c-th channel at i-th frame is computed by:

$$E_{c,i} = \log_2\left(\frac{\sum_{n=0}^{N-1} |x_{c,i}(n)|^2}{N}\right), c = 0, 1, \ldots, C-1$$

where $x_{c,i}(n)$ is the corresponding PCM input. In an initial few frames, $E_{c,i}$ is accumulated and its average is used to set a noise floor $E_{c,i}^{Floor}$. The noise floor of each channel is periodically forced to be replaced with a good candidate from the past few seconds. After this initial stage, the following condition is tested on a per-channel basis to determine channel activity:

$$E_{c,i}^{Floor} = \min(E_{c,i-1}^{Floor}, E_{c,i})$$

$$E_{c,i} > E_{c,i}^{Floor} + E^{Offset}, c = 0, 1, \ldots, C-1$$

In other words, the activity detector 402 determines, in this implementation, if the log energy of the c-th channel at the i-th frame is greater than the noise floor of the channel, plus an offset. If this condition is true, then a channel state is set to "active", otherwise the channel state is set to "pause". Next, a frame state is obtained by combining channel states. The frame state is set to "active" if a few channels are detected as "active," such as at least three; otherwise the frame state is set to "pause."

If the activity detector 402 sets a "Pause" frame state, as determined at 404, then the sound localizer uses the second angle tracker updater 414 (described below) and returns that the angle is "undetected" for that frame.

If the activity detector 402 sets an "active" frame state, as determined at 402, then the a phase analyzer 406 processes the frequency domain data (e.g., 308 in FIG. 3) for the multiple channels to generate a list of candidate angles. The phase analysis is performed with the pre-defined channel pairs whose states are active in both channels. For example, the cross power spectrum of channel pair $C_a$ and $c_b$ is computed by:

$$R_{<c_a,c_b>}(k) = X_{c_a,i}(k) X_{c_b,i}(k)^*, K_{min}^{phase} \leq k \leq K_{max}^{phase} \text{ and } *$$

is the complex conjugate, and its phase spectrum is given by:

$$\arg(R_{\langle c_a, c_b \rangle}(k)) = \tan^{-1}\left(\frac{\text{Imag}[R_{\langle c_a, c_b \rangle}(k)]}{\text{Real}[R_{\langle c_a, c_b \rangle}(k)]}\right), K_{min}^{phase} \leq k \leq K_{max}^{phase}.$$

The best sample lag between channel $C_a$ and $c_b$ is estimated by searching a lag range for the minimum phase distortion against theoretical values:

$$\tau_{\langle c_a, c_b \rangle} = \arg\min_{|l| \leq L_{\langle c_a, c_b \rangle}} \sum_{k=K_{min}^{phase}}^{K_{max}^{phase}} \left|\arg(R_{\langle c_a, c_b \rangle}(k)) - \frac{kl\pi}{N}\right|^2$$

In the foregoing, the lag range of two channels $L_{\langle c_a, c_b \rangle}$ is derived by:

$$L_{\langle c_a, c_b \rangle} = \left\lceil \frac{|d_{\langle c_a, c_b \rangle}| \cdot N_S}{SS} \right\rceil$$

where $\lceil \cdot \rceil$ is the ceiling operation, $|d_{\langle c_a, c_b \rangle}|$ is the geometric distance between two microphone channels, as noted above in connection with FIG. 2, $N_S$ is the sampling rate, e.g., 16 kHz, and SS is the speed of sound (e.g., 340 meters per second). Phase unwrapping is applied to compute the phase distortion in the above equation.

Two mirror-imaged angles (respect to the virtual line between two microphones as shown in FIG. 2) are derived from $\tau_{\langle c_a, c_b \rangle}$, as follows:

$$\tilde{\theta}'_{\langle c_a, c_b \rangle} = \sin^{-1}\left(\frac{\tau_{\langle c_a, c_b \rangle} \cdot SS}{|d_{\langle c_a, c_b \rangle}| \cdot N_S}\right), \text{ and}$$

$$\tilde{\theta}''_{\langle c_a, c_b \rangle} = \begin{cases} \pi - \tilde{\theta}'_{\langle c_a, c_b \rangle}, & \tilde{\theta}'_{\langle c_a, c_b \rangle} \geq 0 \\ -\pi - \tilde{\theta}'_{\langle c_a, c_b \rangle}, & \text{otherwise.} \end{cases}$$

Since these angles are relative to the position of channel pair $\langle c_a, c_b \rangle$, they are compensated by the global angle of the channel pair $\phi_{\langle c_a, c_b \rangle}$:

$$\theta'_{\langle c_a, c_b \rangle} = \tilde{\theta}'_{\langle c_a, c_b \rangle} + \phi_{\langle c_a, c_b \rangle}, \theta''_{\langle c_a, c_b \rangle} = \tilde{\theta}''_{\langle c_a, c_b \rangle} + \phi_{\langle c_a, c_b \rangle}.$$

The above phase analysis procedure is repeated for the pre-defined channel pairs to obtain an initial list of candidates with the estimated angle and its phase distortion. Thus, the output of the phase analysis module 406 is a list of candidate angles, and phase distortion.

A candidate selection module 408 processes the list of candidate angles to refine it towards a selected angle. There are a variety of ways in which to refine this list. For example, if two or more angles are similar to, i.e., within some threshold of, each other, those angles are merged into one angle in the list, such as by averaging them, with a discounted phase distortion of $\epsilon_{min}/M$ where $\epsilon_{min}$ is the minimum phase distortion among the angles and M is the number of similar angles. In this refinement, isolated angles are eliminated and more commonly occurring angles are assigned a smaller distortion. As a result, in later stage processing which selects an angle based on its distortion, the more commonly occurring angle is more likely to be selected.

Figure 5:
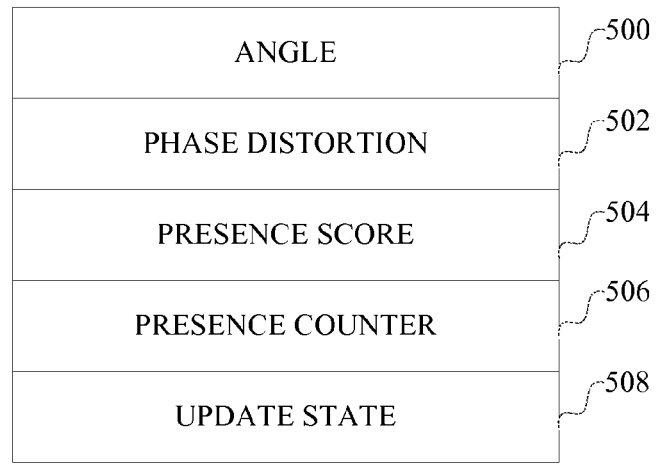
FIG. 5 is a diagram of an example data structure for an angle tracking list.

The refined list of candidate angles, and their phase distortion, is passed on to an first angle tracker update module 410. In this module, a list of candidate angles and phase distortions over time is kept in an angle tracking list. Each entry in this list includes, as shown in FIG. 5, an angle 500, phase distortion 502, presence score 504, presence counter 506, and update state 508. For the first active frame, the candidate list is inserted in the angle tracking list. For subsequent active frames, the data is processed in the following way.

First, an entry in the angle tracking list is identified with the lowest phase distortion from all the entries which have non-zero presence score and have not been updated yet. Next, a target candidate is found in the candidate list with the lowest phase distortion from all the candidates, and for which the angle is similar to the identified entry from the angle tracking list. If such a candidate is found, then the target entry ($\theta_i, \epsilon_i, \delta_i$) is updated with the candidate ($\theta, \epsilon$) as follows:

Angle: $\theta_i = \mu_\theta \theta_{i-1} + (1-\mu_\theta)\theta, \mu_\theta$:constant Phase distortion: $\epsilon_i = \mu_\epsilon \epsilon_{i-1} + (1-\mu_\epsilon)\epsilon, \mu_\epsilon$:constant Presence score: $\delta_i = \max(\delta_{i-1} + \mu_\delta, 1.0), \mu_\delta$:constant Otherwise, a new entry is created from the candidate, as follows:

$\theta_i = \theta, \epsilon_i = \epsilon, \delta_i = \delta^{Init}$

This process is followed until all entries in the angle tracking list and candidate list have been evaluated. Next, the entries which have not been updated in the above procedure are updated in a way that the distortion increases and the presence score decreases. In particular, $\theta_i = \theta_{i-1}, \epsilon_i = \mu'_\epsilon \epsilon_{i-1}, \delta_i = \delta_{i-1} - \mu_\delta, \mu_\epsilon$:constant.

If the presence score becomes below a threshold, such entries are removed from the list. The last step of the update is to scan all the entries again to merge those having similar angles.

Given the angle tracking list, a final selection of an angle for a frame is made by the final selection module 412. For example, an entry is selected from the angle tracking list that meets the following criteria. First, its presence score is greater than or equal to the maximum presence score of the entries in the angle tracking list. Second, its phase distortion is less than or equal to the minimum phase distortion of the entries in the angle tracking list. Third, it has a similar angle to the highest ranked candidate angle obtained from the candidate selection module. The presence counter of this entry is incremented, while that of other entries is decremented. The counter indicates how often the entry is selected in the recent frames. When the counter of the entry exceeds a threshold, its angle $\theta_i$ is reported as a detected angle. If no entry satisfies the above conditions, "Undetected" is returned.

Finally, the second angle tracker updater 414 processes the angle tracking list to scan the tracking entries and update ones which have not been updated in the previous modules. The update formulas are the same as those used in the first angle tracker update, where the distortion gets larger and the presence score gets smaller.

Figure 6:
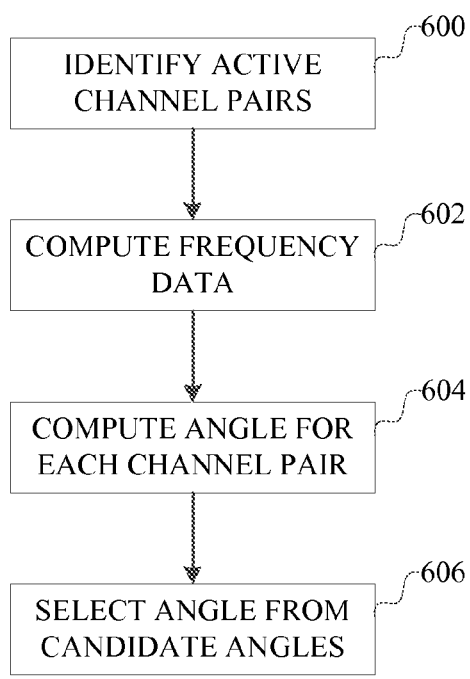
FIG. 6 is a flow chart describing an example implementation of sound source localization.

To summarize, referring to FIG. 6, the process of sound source localization involves identifying 600 active channel pairs within a microphone array. In other words, several microphones, e.g., at least three, are active. The signals from the microphones can be processed by dividing them into frames, with each frame have a number of samples. Thus, whether a microphone (or channel) is active can be determined on a per frame basis. The signals from each active microphone are transformed to compute 602 frequency domain data or frequency spectrum. For each active channel pair, a candidate angle is identified 604 from the frequency domain data. An angle is selected 606 from among the candidate angles identified for the active channel pairs.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
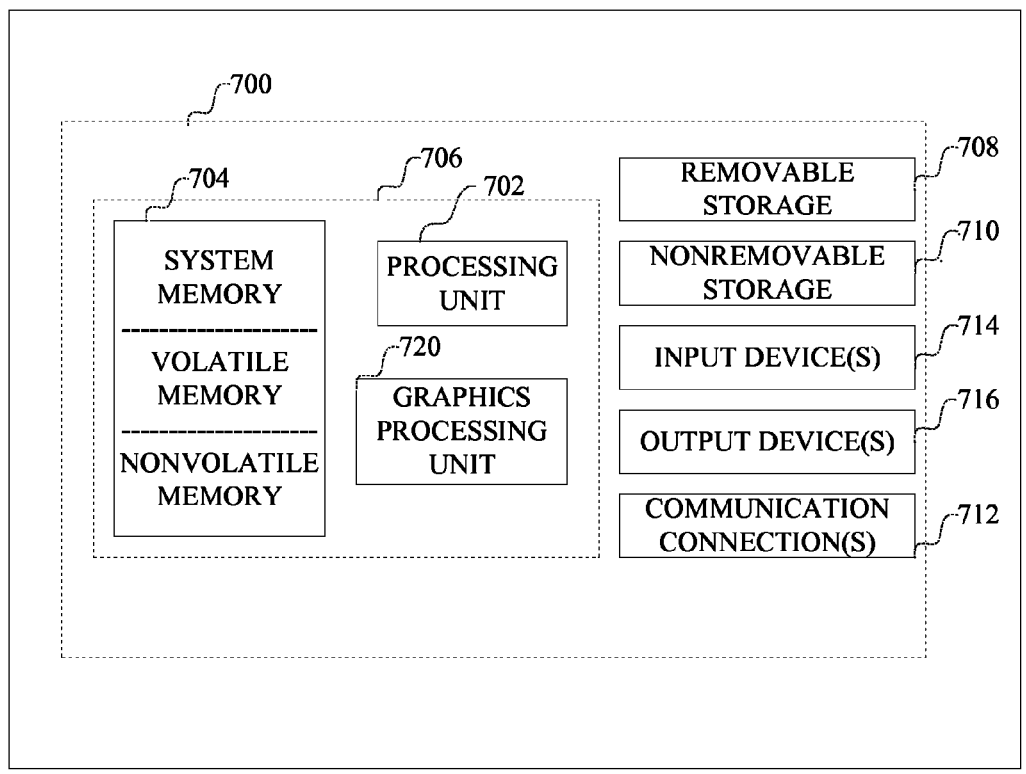
FIG. 7 is a block diagram of an example computing device in which such a system can be implemented.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing machine, such as computing machine 700. In its most basic configuration, computing machine 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, computing machine 700 may also have additional features/functionality. For example, computing machine 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 700. Any such computer storage media may be part of computing machine 700.

Computing machine 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 700 may have various input device(s) 714 such as a display, a keyboard, mouse, pen, camera, touch input device, and so on. Output device(s) 716 such as speakers, a printer, and so on may also be included. All of these devices are well known in the art and need not be discussed at length here.

The system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
receiving signals from a plurality of pairs of microphones into a memory;
processing the signals from the microphones to identify when the signals are active;
computing frequency spectrum data for the signals;
for each pair of active signals:
determining a phase spectrum of a cross power spectrum using the frequency spectrum data of the pair of active signals,
determining a phase distortion for the pair from the phase spectrum, and
deriving a candidate angle from the determined phase distortion; and
selecting an angle from among the candidate angles derived for the plurality of pairs of microphones.

2. The computer-implemented process of claim 1, wherein receiving signals includes receiving each signal as a plurality of frames, and wherein processing, computing, determining and selecting are performed on a per frame basis.

3. The computer-implemented process of claim 1, wherein selecting the angle from among the candidate angles comprises selecting the angle using information about prior candidate angles.

4. The computer-implemented process of claim 3, wherein selecting further comprises:
tracking a history of candidate angles over multiple frames; and
updating the history with the candidate angles from the current frame.

5. The computer-implemented process of claim 4, further comprising selecting the angle from the history which has a phase distortion less than or equal to the minimum phase distortion of all entries.

6. The computer-implemented process of claim 4, further comprising selecting the angle from the history having an angle similar to a highest ranked candidate angle for the frame.

7. The computer-implemented process of claim 4, further comprising selecting the angle from the history having a presence score greater than or equal to a maximum presence score of angles in the history.

8. An article of manufacture comprising:
a computer storage medium;
computer program instructions stored on the computer storage medium which, when processed by a processing device, instruct the processing device to perform a process comprising:
receiving signals from a plurality of pairs of microphones into a memory;
processing the signals from the microphones to identify when the signals are active;
computing frequency spectrum data for the signals;
for each pair of active signals:
determining a phase spectrum of a cross power spectrum using the frequency spectrum data of the pair of active signals,
determining a phase distortion for the pair from the phase spectrum, and
deriving a candidate angle from the determined phase distortion; and
selecting an angle from among the candidate angles derived for the plurality of pairs of microphones.

9. The article of manufacture of claim 8, wherein receiving signals includes receiving each signal as a plurality of frames, and wherein processing, computing, determining and selecting are performed on a per frame basis.

10. The article of manufacture of claim 8, wherein selecting the angle from among the candidate angles comprises selecting the angle using information about prior candidate angles.

11. The article of manufacture of claim 10, wherein selecting further comprises:
tracking a history of candidate angles over multiple frames; and
updating the history with the candidate angles from the current frame.

12. The article of manufacture of claim 11, further comprising selecting the angle from the history which has a phase distortion less than or equal to the minimum phase distortion of all entries.

13. The article of manufacture of claim 11, further comprising selecting the angle from the history having an angle similar to a highest ranked candidate angle for the frame.

14. The article of manufacture of claim 11, further comprising selecting the angle from the history having a presence score greater than or equal to a maximum presence score of angles in the history.

15. A computing machine comprising:
a memory;
an input for receiving signals from a plurality of pairs of microphones into the memory;
a processing unit configured to process the signals from the microphones to identify when the signals are active and compute frequency spectrum data for the signals;
wherein the processing unit is further configured to, for each pair of active signals, determine a phase spectrum of a cross power spectrum using the frequency spectrum data of the pair of active signals, determine a phase distortion for the pair using the phase spectrum, and derive a candidate angle from the phase distortion, and select an angle from among the candidate angles derived for the plurality of pairs of microphones.

16. The computing machine of claim 15, wherein the input receives and stores each signal as a plurality of frames, and wherein the processing unit is configured to process the signals on a per frame basis.

17. The computing machine of claim 15, wherein the memory further stores a history of candidate angles over multiple frames, and the processing unit is configured to update the history with the candidate angles from the current frame.

18. The computing machine of claim 17, wherein the angle selected from the history has a phase distortion less than or equal to the minimum phase distortion of all entries.

19. The computing machine of claim 17, wherein the angle selected from the history has an angle similar to a highest ranked candidate angle for the frame.

20. The computing machine of claim 17, wherein the angle selected from the history has a presence score greater than or equal to a maximum presence score of angles in the history.

* * * * *